United States Patent
Sindoni

(10) Patent No.: US 7,610,044 B2
(45) Date of Patent: Oct. 27, 2009

(54) METHODS AND SYSTEMS FOR RINGTONE DEFINITION SHARING

(75) Inventor: Christopher Sindoni, San Francisco, CA (US)

(73) Assignee: DJ Nitrogen, Inc., San Francisco, CA (US)

( * ) Notice: Subject to any disclaimer, the term of this patent is extended or adjusted under 35 U.S.C. 154(b) by 73 days.

(21) Appl. No.: 11/669,111

(22) Filed: Jan. 30, 2007

(65) Prior Publication Data

US 2007/0201685 A1    Aug. 30, 2007

Related U.S. Application Data

(60) Provisional application No. 60/765,228, filed on Feb. 3, 2006.

(51) Int. Cl.
*H04M 3/42* (2006.01)
*H04M 11/00* (2006.01)
*H04W 7/00* (2006.01)

(52) U.S. Cl. .............. 455/414.1; 455/418; 455/466

(58) Field of Classification Search ............. 455/567, 455/414.1, 418, 466; 709/201; 707/101
See application file for complete search history.

(56) References Cited

U.S. PATENT DOCUMENTS

| | | | |
|---|---|---|---|
| 5,732,216 A | 3/1998 | Logan et al. | |
| 5,892,536 A | 4/1999 | Logan et al. | |
| 5,986,692 A | 11/1999 | Logan et al. | |
| 6,044,047 A | 3/2000 | Kulas | |
| 6,199,076 B1 | 3/2001 | Logan et al. | |
| 6,225,546 B1 | 5/2001 | Kraft et al. | |
| 6,888,999 B2 * | 5/2005 | Herberger et al. | 386/65 |
| 7,035,675 B2 * | 4/2006 | Yamada | 455/567 |
| 7,035,709 B2 | 4/2006 | Yamada | |
| 7,058,429 B2 | 6/2006 | Fujito et al. | |
| 7,177,872 B2 | 2/2007 | Schwesig et al. | |
| 2002/0035728 A1 | 3/2002 | Fries | |
| 2003/0093790 A1 | 5/2003 | Logan et al. | |
| 2003/0109251 A1 | 6/2003 | Fujito et al. | |

(Continued)

FOREIGN PATENT DOCUMENTS

WO    WO 2006/002645 A1    1/2006

OTHER PUBLICATIONS

Hans et al., "Interacting with Audio Streams for Entertainment and Communication," Abstract, 7 pages.*

(Continued)

*Primary Examiner*—Lester Kincaid
*Assistant Examiner*—Nathan Mitchell

(57) ABSTRACT

A system comprises a ringtone originator, a ringtone sharing device, and a ringtone receiver. The ringtone originator (e.g., one or more of a personal computer, a mobile telephone, a PDA, or other computing device) allows a user to generate ringtone content using audio content stored locally. A ringtone definition, describing characteristics of the audio content and manipulations used to transform the audio content to the ringtone content, is generated and is sent to the ringtone sharing device. The ringtone sharing device (e.g., a server operated by a commercial service provider or a mobile telephone service provider) stores a plurality of ringtone definitions that can be accessed by the ringtone receiver. The ringtone receiver (e.g., one or more of a personal computer, a mobile telephone, a PDA, or other computing device) can download the ringtone definition and recreate the ringtone content.

14 Claims, 9 Drawing Sheets

U.S. PATENT DOCUMENTS

| | | | |
|---|---|---|---|
| 2003/0176206 A1* | 9/2003 | Taniguchi et al. | 455/567 |
| 2003/0224720 A1* | 12/2003 | Jung | 455/3.05 |
| 2004/0089141 A1* | 5/2004 | Georges et al. | 84/609 |
| 2004/0106395 A1* | 6/2004 | Suganuma et al. | 455/412.2 |
| 2004/0168123 A1* | 8/2004 | Lomelin-Stoupignan et al. | 715/513 |
| 2005/0004690 A1 | 1/2005 | Zhang et al. | |
| 2005/0021552 A1 | 1/2005 | Ackley et al. | |
| 2005/0172152 A1 | 8/2005 | Orr | |
| 2005/0177379 A1 | 8/2005 | Gaik | |
| 2006/0023862 A1 | 2/2006 | Sutcliffe | |
| 2006/0111085 A1 | 5/2006 | Lee | |
| 2006/0129909 A1 | 6/2006 | Butt et al. | |
| 2006/0149781 A1 | 7/2006 | Blankinship | |
| 2006/0184980 A1 | 8/2006 | Cole | |
| 2006/0235550 A1 | 10/2006 | Csicsatka et al. | |
| 2006/0256189 A1* | 11/2006 | Crofton | 348/14.15 |
| 2006/0259434 A1 | 11/2006 | Vilcauskas, Jr. et al. | |
| 2007/0124788 A1* | 5/2007 | Wittkoter | 725/112 |
| 2007/0133760 A1 | 6/2007 | Cotignola et al. | |
| 2007/0150539 A1* | 6/2007 | O'Sullivan et al. | 709/204 |
| 2007/0193435 A1* | 8/2007 | Hardesty et al. | 84/609 |
| 2007/0207782 A1 | 9/2007 | Tran | |
| 2007/0239883 A1* | 10/2007 | Glenn | 709/231 |
| 2008/0004079 A1* | 1/2008 | Macaluso | 455/564 |
| 2008/0167995 A1* | 7/2008 | Cue et al. | 705/59 |

OTHER PUBLICATIONS

Hans et al., "A Wearable Networked MP3 Player and 'Turntable' for Collaborative Scratching," Abstract, Mobile & Media Systems Lab, Hewlett-Packard Labs, 8 pages.*

"Skype General Discussion" to Skype Forums. Accessed from http://web.archive.org/web/20080118164254/http://forum.skype.com/lofiversion/index.php/t27416.html on May 20, 2009.*

"Getting Started with Flash Lite 1.x", http://livedocs.adobe.com/flash/9.0/main/flashlitel_gettingstarted.pdf., Retrieved Oct. 26, 2008, pp. 1-39.

Introducing Macromedia Flash Lite 1.1, <http://www.adobe.com/devnet/logged_intevans_flashlite.html>, Published Jun. 14, 2004, pp. 1-3.

"Introducing to Animation in Flash Lite 1.1", http://www.adobe.com/devnet/devices/articles/flashlite_training_excerpt_03.html>, Retrieved Oct. 26, 2008, pp. 1-3.

"Learning Flash Lite 1.x Actionscript", http://livedocs.adobe.com/flash/9.0/main.flashlite1_as_learning.pdf., Retrieved Oct. 26, 2008, pp. 1-30.

"Macromedia Delivers Flash Lite 1.1", <http://www.adobe.com/macromedia/proom/pr/2004/flash_lite.html>, Published Jun. 28, 2004, pp. 1-4.

"Pikkle Flashlite", (Macromedia MAX Nov. 15, 2005, http://www.adobe.com/kr/events/max2005/agenda/presentation/c8.swf), pp. 1-38.

Using Sound in Flash Lite 1.1, http://www.adobe.com/devnet/devices/articles/flashlite_sound_03.html.Retrieved Oct. 22, 2008, 1 Page.

* cited by examiner

METHODS AND SYSTEMS FOR RINGTONE DEFINITION SHARING

CROSS REFERENCE TO RELATED APPLICATIONS

This application claims the benefit of prior filed co-pending U.S. Provisional Application Ser. No. 60/765,228, filed Feb. 3, 2006, entitled "Ringtone Definition Sharing" by Christopher Sindoni, the contents of which are incorporated herein by reference.

FIELD OF THE INVENTION

The present invention relates generally to ringtone content, and more specifically, to sharing ringtone definitions used for generating ringtone content from audio content without sharing audio content files or ringtone content files.

BACKGROUND

Responsive to an incoming telephone call, many mobile telephones can play ringtone content, such as a clip of a popular song, rather than traditional ringing sounds. Some mobile telephones also allow users to associate ringtone content with specific incoming telephone numbers. This allows users to identify incoming callers from the sound of the ringtone content.

One way for users to implement ringtone content is to download turnkey files from third-party providers that license audio content used to generate the ringtone content. The license typically allows the third-party to resell, distribute, and/or make derivative works. The downloads can be sent through a network using, for example, SMS (Short Message Server), WAP (Wireless Access Protocol) push, MMS (Multimedia Message Server), a telephone network, and the like. Another way for users to implement ringtone content is to create their own. Sound editing software on a personal computer can be used to splice, blend, and apply other edits to audio content. The resulting ringtone content is then transferred to the mobile telephone for playback during incoming calls.

However, users that desire a variety of ringtone content can incur significant expenses by relying on the third-party which in turn needs to recoup licensing fees. A user that has already licensed the audio source through, for example, a CD purchase, effectively pays an additional licensing fee for the same audio content. On the other hand, users risk running afoul of copyright laws by sharing ringtone content without a license. Moreover, manual generation of ringtone content can be burdensome for some users and too complex for others.

Accordingly, a need exists for recreating ringtone content among devices (e.g., mobile phones) independently from audio content used to generate the ringtone content.

SUMMARY

The present invention addresses the above needs by providing systems and methods for sharing ringtone definitions. In one embodiment, a system comprises a ringtone originator, a ringtone sharing device, and a ringtone receiver. The ringtone originator (e.g., one or more of a personal computer, a mobile telephone, a PDA, or other computing device) allows a user to generate ringtone content using audio content stored locally. A ringtone definition, describing characteristics of the audio content and manipulations (or edits) used to transform the audio content into ringtone content, is generated and sent to the ringtone sharing device. The ringtone sharing device (e.g., a server operated by a commercial service provider or a mobile telephone service provider) stores a plurality of ringtone definitions that can be downloaded by the ringtone receiver. The ringtone receiver (e.g., one or more of a personal computer, a mobile telephone, a PDA, or other computing device) can submit queries to search the ringtone sharing device by, for example, artist name, ringtone originator (ringtone author), and the like. To recreate ringtone content, the ringtone receiver uses the ringtone definition to identify a local instance of the audio content and subsequently applies the edits associated with the ringtone definition to the local instance of the audio content.

Advantageously, ringtone content can be easily recreated without running afoul of copyright laws. In addition, a desirable ringtone created by one user is easily accessibly to other users who also have a locally stored instance of the audio content.

The features and advantages described in the specification are not all inclusive and, in particular, many additional features and advantages will be apparent to one of ordinary skill in the art in view of the drawings, specifications, and claims. Moreover, it should be noted that the language used in the specification has been principally selected for readability and instructional purposes and may not have been selected to delineate or circumscribe the inventive matter.

BRIEF DESCRIPTION OF THE DRAWINGS

The teachings of the present invention can be readily understood by considering the following detailed description in conjunction with the accompanying figures. However, the embodiments and figures are illustrative rather than limiting; they provide examples of the invention.

DETAILED DESCRIPTION

In the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments of the invention.

Systems and methods for sharing ringtone content are described. In one embodiment a ringtone definition is shared between users without copying audio content or ringtone content between users. For example, a mobile telephone user can search a web site for ringtone definitions that can be used in conjunction with a popular song that the user has previously purchased and stored locally (e.g., an MP3 file of the song purchased/licensed online). The user can then download the resulting ringtone definition, create ringtone content using the ringtone definition and locally stored audio content associated with the ringtone definition, and store the ringtone content locally for signaling incoming calls.

A ringtone definition (e.g., a data file) refers to a description (or characteristics) of audio content (e.g., one or more digital files formatted in, for example, WAV, MP3, MIDI, WMA, MP4, MC, AIFF, and the like), and manipulations (or edits) applied to the audio content to generate ringtone content. The audio content description can include, for example, a song name, a unique identification number, a track number, a file format, a bit rate, a length, and other characteristics of an audio file. The manipulations (or edits) can include, but not limited to, splices, ramping up, ramping down, blends, and the like. Audio content refers to an original source of audio (e.g., a full length MP3) that can be copyrighted. Each instance of audio content refers to an individual copy of the audio content. Ringtone content is the result of manipulations (or edits) to one or more instances of audio content, and can be loaded onto a device such as a mobile telephone for playback during an incoming call.

Figure 1:
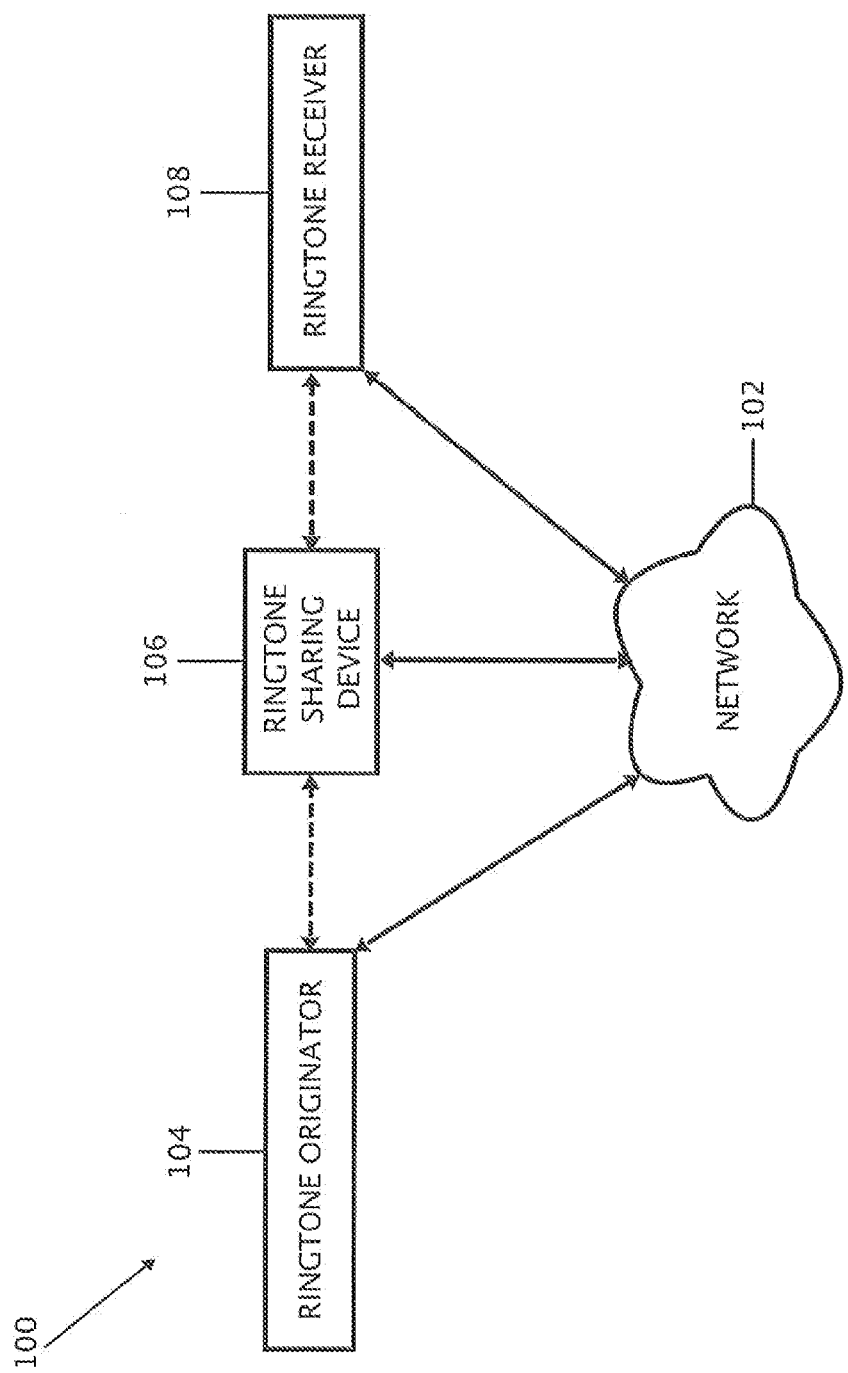
FIG. 1 is a block diagram illustrating a system for sharing ringtone definitions over client/server connections according to one embodiment of the present invention.

FIG. 1 is a block diagram illustrating a system 100 for sharing ringtone definitions over client/server connections according to one embodiment of the present invention. A network 102 (e.g., a data network such as the Internet, or a telephone network) provides communication between a ringtone originator 104, a ringtone sharing device 106 and a ringtone receiver 108. The ringtone originator 104 (e.g., one or more of a personal computer, a mobile telephone, a PDA, or other computing device as shown in more detail in FIGS. 3-5) allows a user to generate ringtone content using audio content stored locally. The ringtone originator 104 derives a ringtone definition from the locally stored audio content and edits made to the locally stored audio content in order to create ringtone content from audio content, and sends the ringtone definition to the ringtone sharing device 106. The ringtone sharing device 106 (e.g., a server operated by a commercial service provider or a mobile telephone service provider as shown in more detail in FIG. 6) stores a plurality of ringtone definitions that can be accessed (e.g., downloaded) by the ringtone receiver 108. The ringtone receiver 108 (e.g., one or more of a personal computer, a mobile telephone, a PDA, or other computing device) can submit queries to search the ringtone sharing device 106 by, for example, artist name, ringtone originator, and the like. To create ringtone content, the ringtone receiver 108 uses a ringtone definition to locate a local instance of audio content associated with the ringtone definition, and to apply edits associated with the ringtone definition to the local instance of the audio content.

Figure 2:
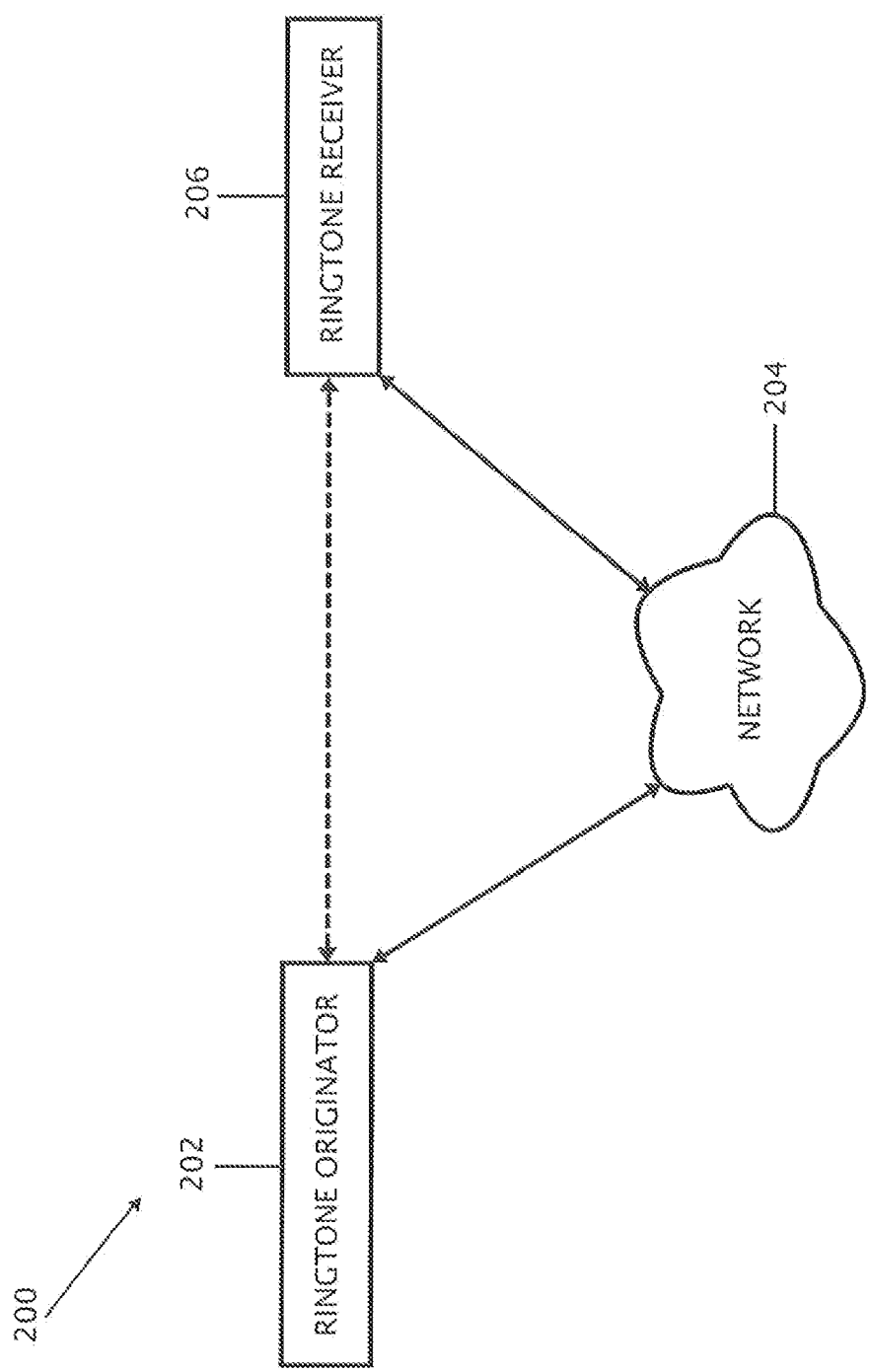
FIG. 2 is a block diagram illustrating a system for sharing ringtone definitions over a peer-to-peer connection according to one embodiment of the present invention.

FIG. 2 is a block diagram 200 illustrating a system for sharing ringtone definitions over a peer-to-peer connection according to one embodiment of the present invention. The ringtone originator 202 in FIG. 2 is configured to share ringtone definitions through a direct connection (illustrated by the dashed line) to the ringtone receiver 206. In this embodiment, the ringtone originator 202 and the ringtone receiver 206 have a direct peer relationship for sharing ringtone definitions.

Figure 3:
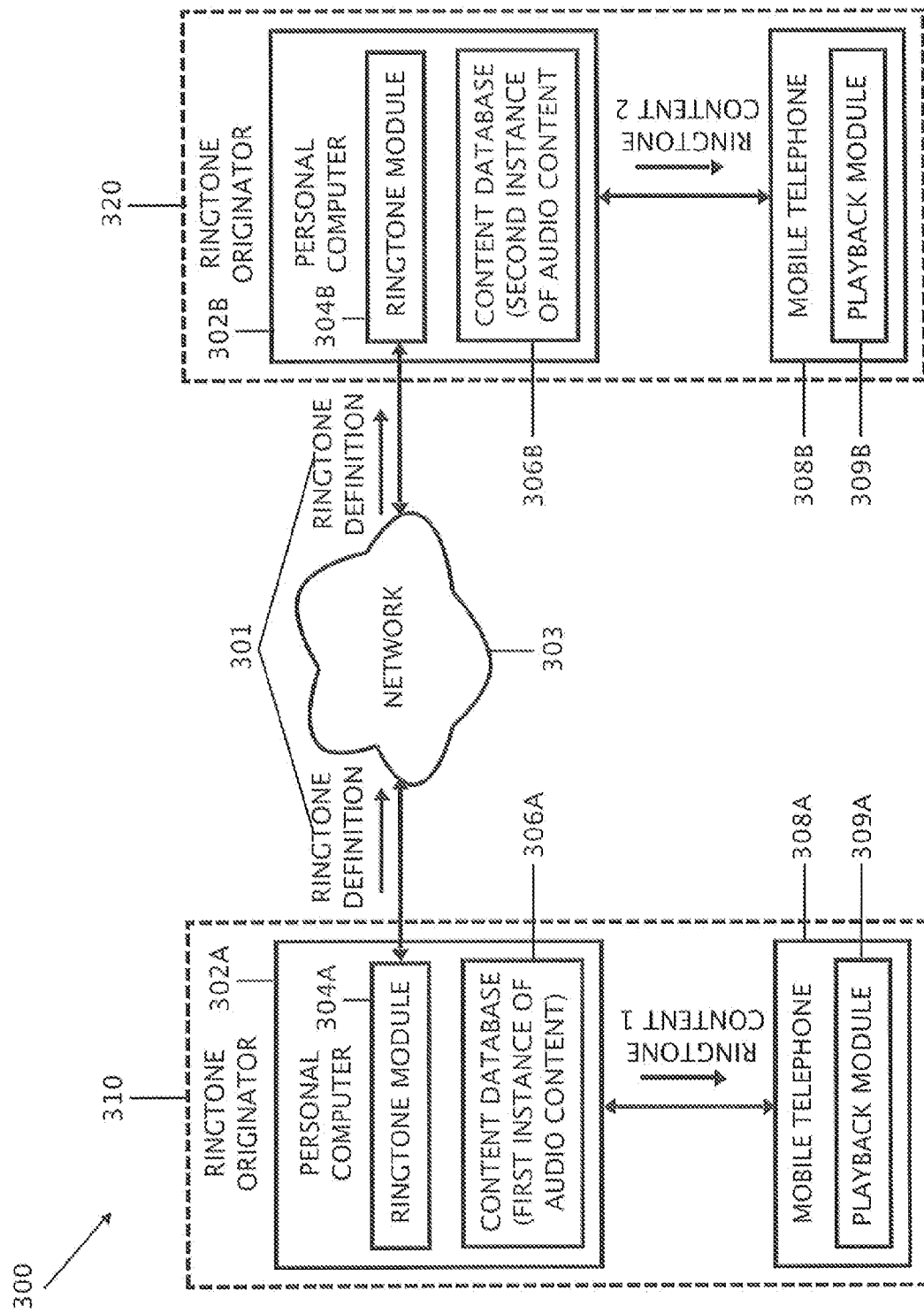
FIG. 3 is a block diagram illustrating a ringtone originator and a ringtone receiver sharing ringtone definitions via a network.

FIG. 3 is a block diagram 300 illustrating a ringtone originator and a ringtone receiver sharing ringtone definitions via a network. In the example of FIG. 3, a ringtone originator 310 and ringtone receiver 320 include personal computers 302 as well as mobile telephones 308. The personal computer 302A includes content databases 306A for storing a first instance of audio content. The personal computer 302A also comprises a ringtone module 304A for generating ringtone content and associated ringtone definitions. In one embodiment, the ringtone originator 310 or the ringtone receiver 320 can be a single device (e.g., a mobile telephone). The ringtone receiver 320 receives the ringtone definition 301 originating from the ringtone originator 310 via a network 303. The network 303 may be composed of any group of interconnected communication systems including a local area network (LAN), a wide area network (WAN), a telephone network, and the like. In one embodiment, the ringtone definition 301 comprises characteristics of and edits made to a first instance of audio content in order to generate corresponding ringtone content. Based on the characteristics of the ringtone definition 301, the personal computer 302B locates a second instance of the audio content on the content database 306B, and the ringtone module 304B recreates ringtone content by editing the second instance of the audio content according to the edits associated with the ringtone definition 301. The personal computer 302B sends the recreated ringtone content to the mobile telephone 308B and mobile telephone 308B stores the ringtone content in a local database or memory (not shown). The mobile telephone 308B includes a playback module 309B (e.g., a Windows® Media Player or a RealAudio® media player) to play the ringtone content upon events such as an incoming call.

The example in FIG. 3 is illustrative and not limiting. One ordinarily skilled in the art will understand that a system suitable to carry out the methods of the invention may include additional and/or fewer components. In one embodiment, the ringtone originator 310 may not include a mobile telephone 308A. In another embodiment, the content databases 306 are external databases that the personal computers 304 accesses through a network such as the Internet. In one embodiment, the first and the second instance of the audio content are duplicates. In another embodiment, the first and the second instances of the audio content are different versions of the same song wherein there is little or no perceptive difference between the ringtone content generated from the first instance of the audio content and the ringtone content recreated from the second instance of the audio content. An exhaustive list of all combinations and permutations of embodiments has not been attempted here but one skilled in the relevant art will recognize alternative embodiments based on the system described above.

Figure 4:
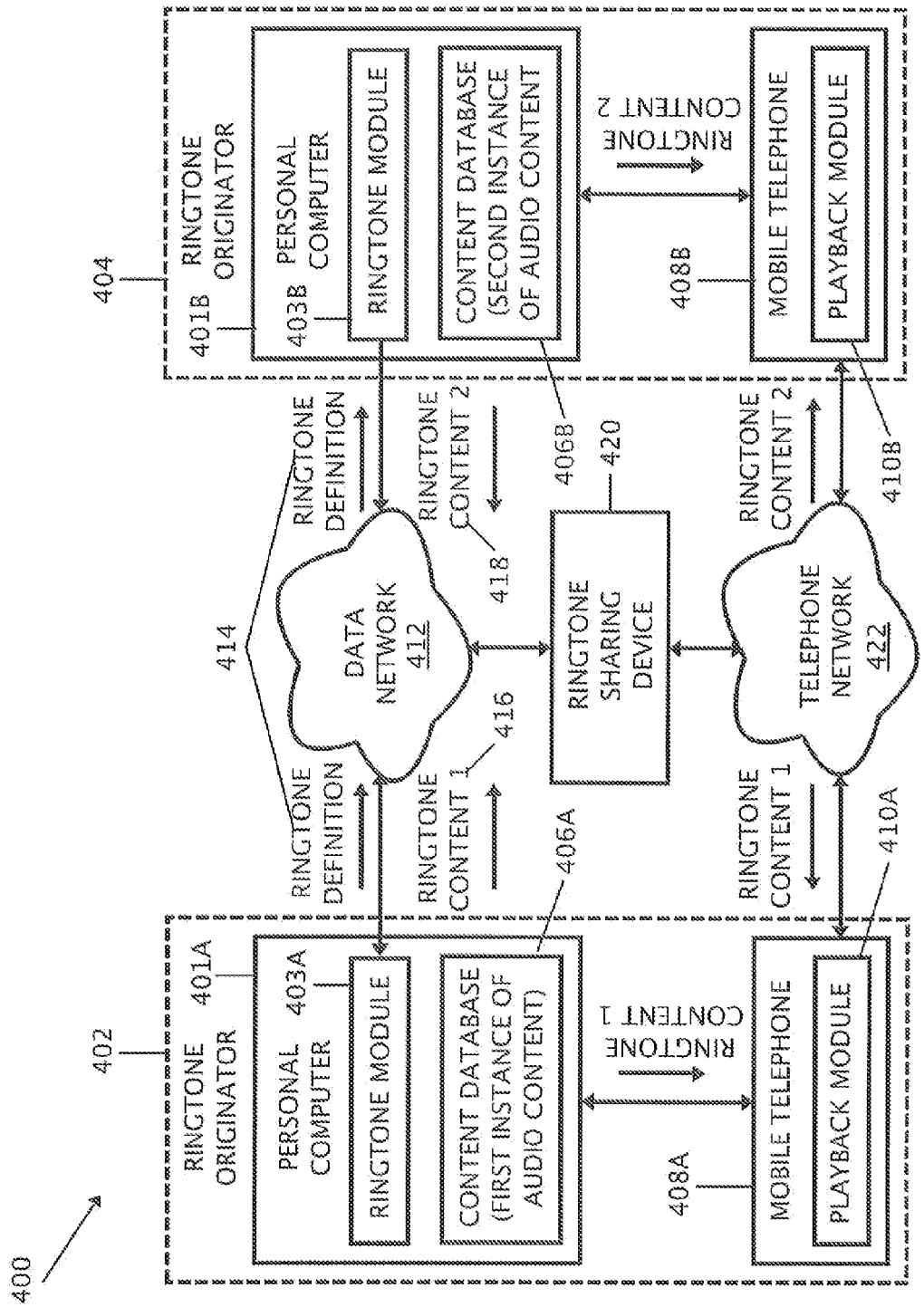
FIG. 4 is a block diagram illustrating a ringtone originator and a ringtone receiver sharing ringtone definitions via a ringtone sharing device.

FIG. 4 is a block diagram 400 illustrating a ringtone originator and a ringtone receiver sharing ringtone definitions via a ringtone sharing device. In the example of FIG. 4, a ringtone originator 402 and ringtone receiver 404 include personal computers 401 as well as mobile telephones 408 respectively. The personal computers 401 are coupled to a ringtone sharing device 420 through a data network 412 and a telephone network 422. The data network 412 may be composed of any group of interconnected communication systems including a local area network (LAN), a wide area network (WAN), a telephone network, and the like. The ringtone sharing device 420 may be a server operated by a commercial service provider or a mobile telephone service provider. In one embodiment, the ringtone sharing device 420 stores a plurality of ringtone definitions from ringtone originators such as originator 402. In one embodiment, the ringtone sharing device 420 may be operated by a service provider who purchases ringtone definitions from ringtone designers/originators and subsequently provides ringtone definition downloads to ringtone receivers/users who subscribe to the provider's services. In another embodiment, the ringtone sharing device 420 may be operated by a service provider that facilitates ringtone definition sharing between shareware designers/originators and ringtone receivers/users.

In one embodiment of the system in FIG. 4, the ringtone module 403A creates, from the audio content stored in the content database 406A, one or more sets of ringtone content and associated ringtone definitions. The module 403A then sends the ringtone definitions to the ringtone sharing device 420 via the data network 412 whereby the ringtone sharing device 420 stores the received ringtone definitions. In one embodiment, when the ringtone receiver 404 sends a query for a specific ringtone identified by characteristics such as artist name, album name, and track number, the ringtone sharing device 420 receives the query and sends the ringtone definition matching the query to the ringtone receiver 404 via the data network 412. The ringtone receiver 404 can then recreate the ringtone content with the ringtone definition and a local instance of the audio content associated with the ringtone. The personal computer 403B sends the recreated ringtone content to the mobile telephone 408B for playback to signal incoming calls. Since the ringtone receiver 404 obtains ringtone definitions rather than ringtone content, the ringtone receiver 404 must have a local instance of the audio content associated with the ringtone and therefore the receiver 404 is unlikely to violate any copyright laws by recreating the ringtone content with the ringtone definition. In one embodiment, the ringtone sharing device 420 is operated by a service provider who purchases the ringtone definitions from ringtone originator 402. In one embodiment, the ringtone receiver 404 is associated with a user who subscribes to the ringtone sharing device 420 for a fee. By contrast, the ringtone originator 402 and/or the receiver 404 do not download the ringtone content 416 and 418 but the content 416 and 418 are transferred from the personal computers 403 to the mobile telephones 408 by uploading through the data network 412 and downloading through the telephone network 422.

The example in FIG. 4 is illustrative and not limiting. One ordinarily skilled in the art will understand that a system suitable to carry out the methods of the invention may include additional and/or fewer components. In one embodiment, the ringtone originator 402 may not include a mobile telephone 408A. In another embodiment, the content databases 406 are external databases that the personal computers 401 accesses through a network such as the Internet. In yet another embodiment, the system of FIG. 4 does not include a telephone network 422 and the ringtone originator 402 and receiver 404 only share ringtone definitions via the data network 412 and the ringtone sharing device 418. Moreover, the ringtone originator 402 and receiver 404 are exemplary and it is understood by one skilled in the art that one or more ringtone originators may create ringtone definitions that are subsequently sent to one or more ringtone receivers via the data network 412 and the ringtone sharing device 420. An exhaustive list of all combinations and permutations of embodiments has not been attempted here but one skilled in the relevant art will recognize alternative embodiments based on the system described above.

Figure 5:
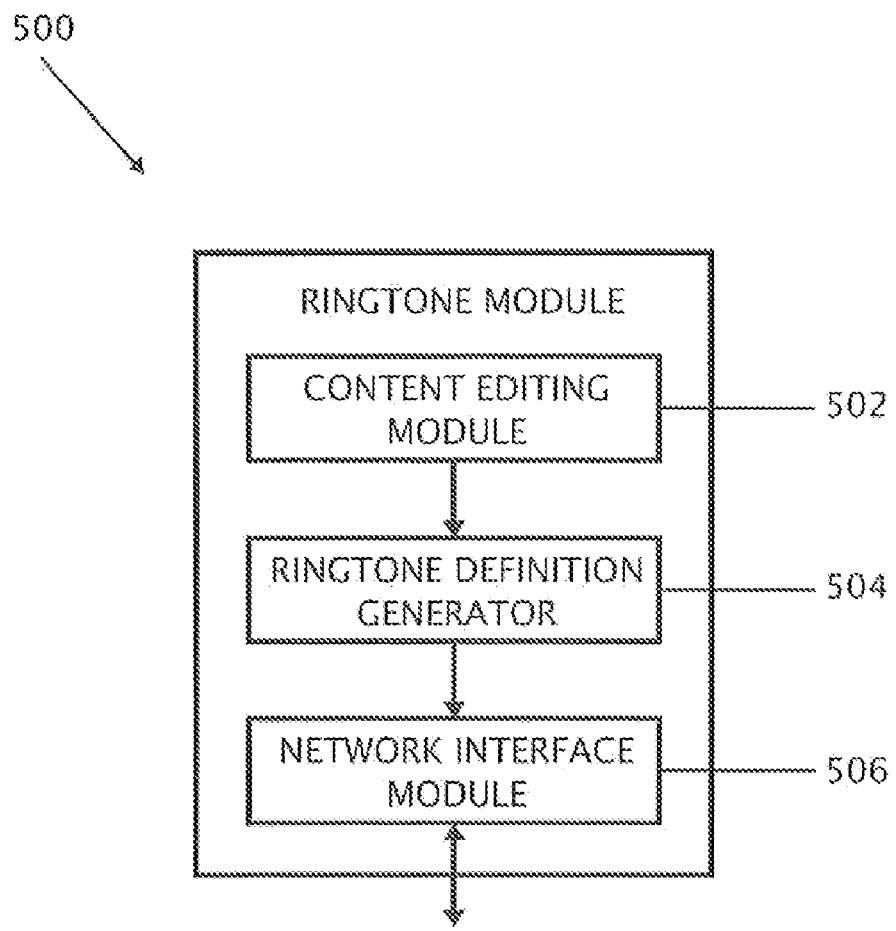
FIG. 5 is a block diagram illustrating a ringtone module according to one embodiment of the present invention.

FIG. 5 is a block diagram illustrating a ringtone module 500 according to one embodiment of the present invention. In the example of FIG. 5, the ringtone module 500 includes a content editing module 502, a ringtone definition generator 504, and a network interface module 506. The content editing module 502 may be an audio-editing software that provides a timeline of audio content through a user interface such as a computer monitor. In one embodiment, a user utilizes the content editing module 502 to manipulate audio content. The manipulations may include, but are not limited to, splices, ramp ups, ramp downs, blending, and the like. The content editing module 502 outputs the edited audio content by encoding a resulting audio file derived from the original audio content and the user's interactions with the content editing module. The content editing module also outputs data describing the original audio content (e.g. song name, length, bit rate, etc.) and the manipulations applied to it (e.g. start frame, stop frame, fades, special effects, etc.) in order to derive the resulting audio file. The ringtone definition generator 504 formats the ringtone definition data into a format appropriate for sharing over computer networks. The resulting definition may later be used to locate other instances of the audio content and convert those instances of audio content to ringtone content as described with reference to FIGS. 3 and 4. In another embodiment, the ringtone definition generator 504 generates an edit list or algorithm of edits as a ringtone definition that is later used to locate and transform audio content to ringtone content. In one embodiment, the ringtone definition generator 504 generates and forwards the ringtone definitions to the network interface module 506 for upload to a network such as those described with reference to FIGS. 3 and 4. In one embodiment, the network interface module 506 formats ringtone content and ringtone definitions in data packets appropriate for transport across a network including, but not limited to, a LAN, a Wan, a telephone network, and the like.

Figure 6:
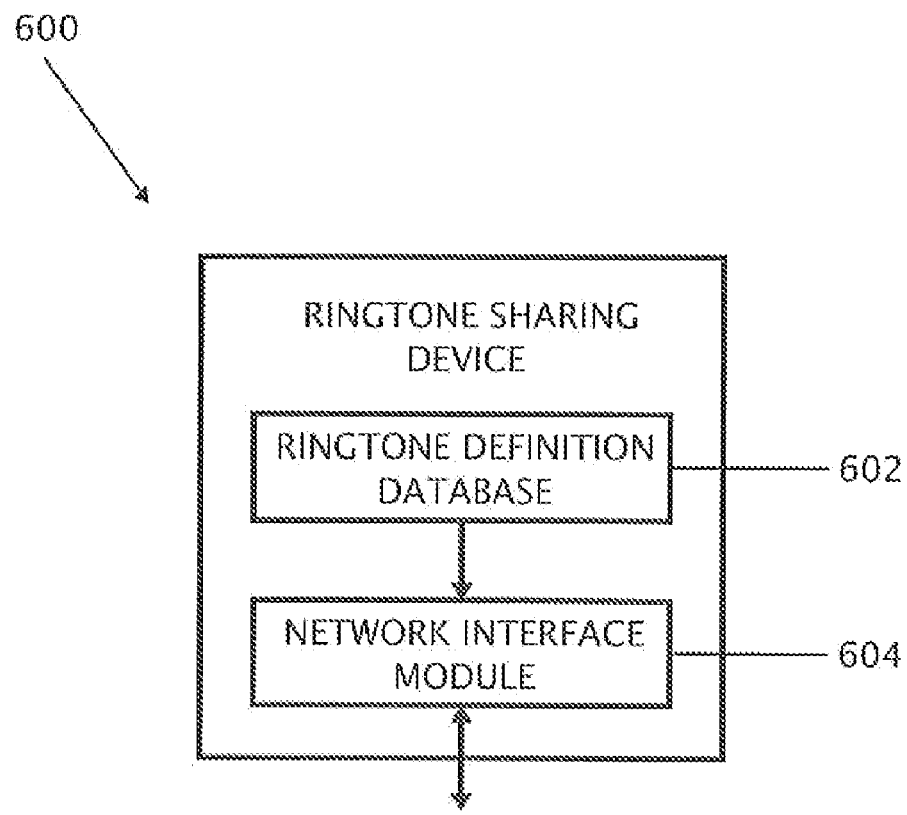
FIG. 6 is a block diagram illustrating a ringtone sharing device according to one embodiment of the present invention.

FIG. 6 is a block diagram illustrating a ringtone sharing device 600 according to one embodiment of the present invention. In the example of FIG. 6, the ringtone sharing device 600 includes a ringtone definition database 602 and a network interface module 604. In one embodiment, the ringtone definition database 602 receives and stores ringtone definitions from one or more ringtone originators as described with reference to FIGS. 3 and 4. In another embodiment, the ringtone definition database may be an external database or memory that the ringtone sharing device 600 accesses via a network such as the Internet. In one embodiment, the ringtone sharing device receives queries for ringtone definitions via the network interface module 604 and retrieves ringtone definitions associated with the queries from the ringtone definition database 602. The retrieved ringtone definitions are then uploaded, via the network interface module 604, to a network such as those described with reference to FIGS. 3 and 4. In one embodiment, the network interface module 604 formats ringtone content and ringtone definitions in data packets appropriate for transport across a network including, but not limited to, a LAN, a Wan, a telephone network, and the like.

Figure 7:
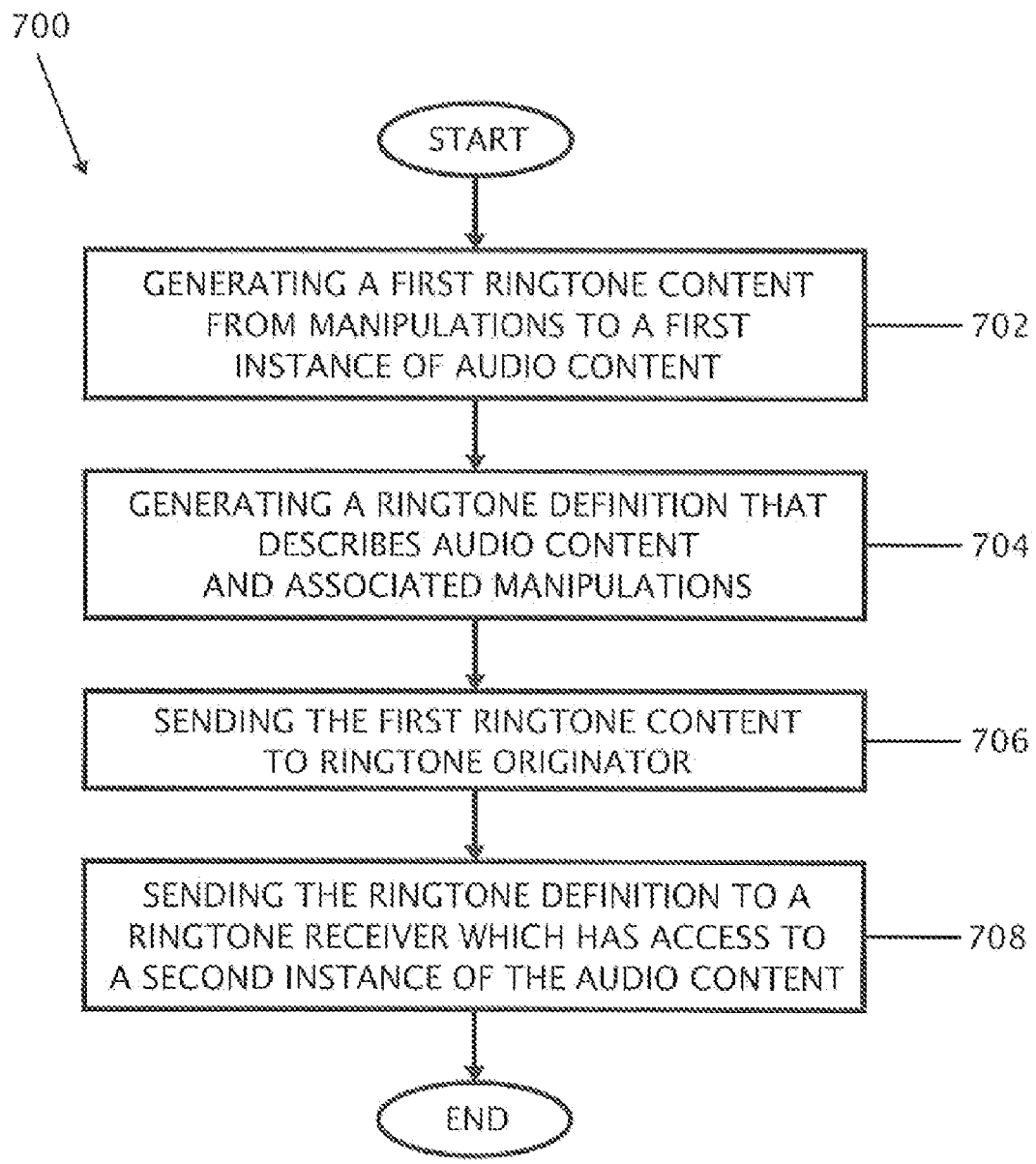
FIG. 7 is a flow chart illustrating a method for providing ringtone definitions according to one embodiment of the present invention.

FIG. 7 is a flow chart 700 illustrating a method for providing ringtone definitions according to one embodiment of the present invention. The example of FIG. 7 starts in module 702 where a personal computer associated with a ringtone originator generates ringtone content by manipulating a first instance of audio content. The manipulations may include, but are not limited to, splices, ramp ups, ramp downs, blending, and the like. The example of FIG. 7 continues to module 704 where a ringtone definition is generated to describe the first instance of the audio content and the manipulations performed on the first instance of the audio content in module 702. The example of FIG. 7 continues to module 706 where the resulting ringtone content is sent to a mobile telephone associated with the ringtone originator. The example of FIG. 7 continues to module 708 where the ringtone originator sends the ringtone definition associated with the ringtone content to a ringtone receiver that has access to a second instance of the audio content. In one embodiment, the ringtone receiver receives the ringtone definition, locates the second instance of the audio content, and recreates the ringtone content using the ringtone definition and the second instance of the audio content. In another embodiment, the ringtone receiver receives the ringtone definition, locates an instance of the audio content that is substantially similar to the first instance of the audio content (e.g. different versions of the same song), and recreates the ringtone content using the ringtone definition and the instance of the audio content that is substantially similar to the first instance of the audio content.

Figure 8:
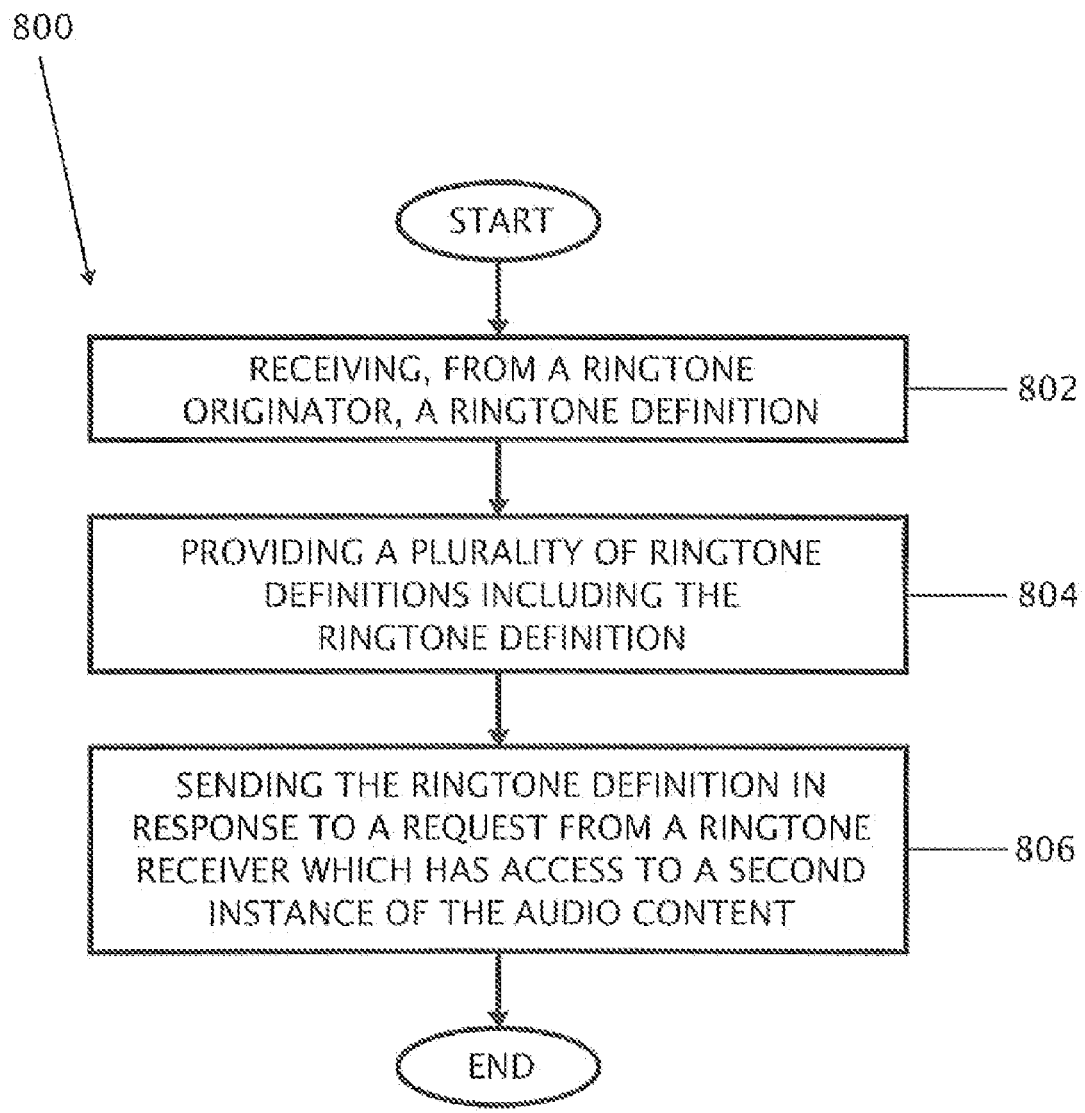
FIG. 8 is a flow chart illustrating a method for sharing ringtone definitions according to one embodiment of the present invention.

FIG. 8 is a flow chart 800 illustrating a method for sharing ringtone definitions according to one embodiment of the present invention. The example of FIG. 8 starts in module 802 where a ringtone sharing device receives a ringtone definition from a ringtone originator. The example of FIG. 8 continues to module 804 where the ringtone sharing device receives a plurality of ringtone definitions, including the ringtone definition, from one or more ringtone originators and stores the definitions so that one or more users (e.g., web site subscribers, or cell phone service subscribers) may query and retrieve the ringtone definitions. The example of FIG. 8 continues to module 806 where the ringtone sharing device sends the ringtone definition to a ringtone receiver in response to a query from the ringtone receiver. In one embodiment, the ringtone receiver has access to a second instance of the audio content associated with the ringtone definition and recreates the ringtone content using the ringtone definition and the second instance of the audio content. In another embodiment, the ringtone receiver has access to an instance of audio content that is substantially similar to the audio content associated with the ringtone definition and recreates the ringtone content using the ringtone definition and the instance of the audio content that is substantially similar (e.g. different versions of the same song) to the audio content associated with the ringtone definition.

Figure 9:
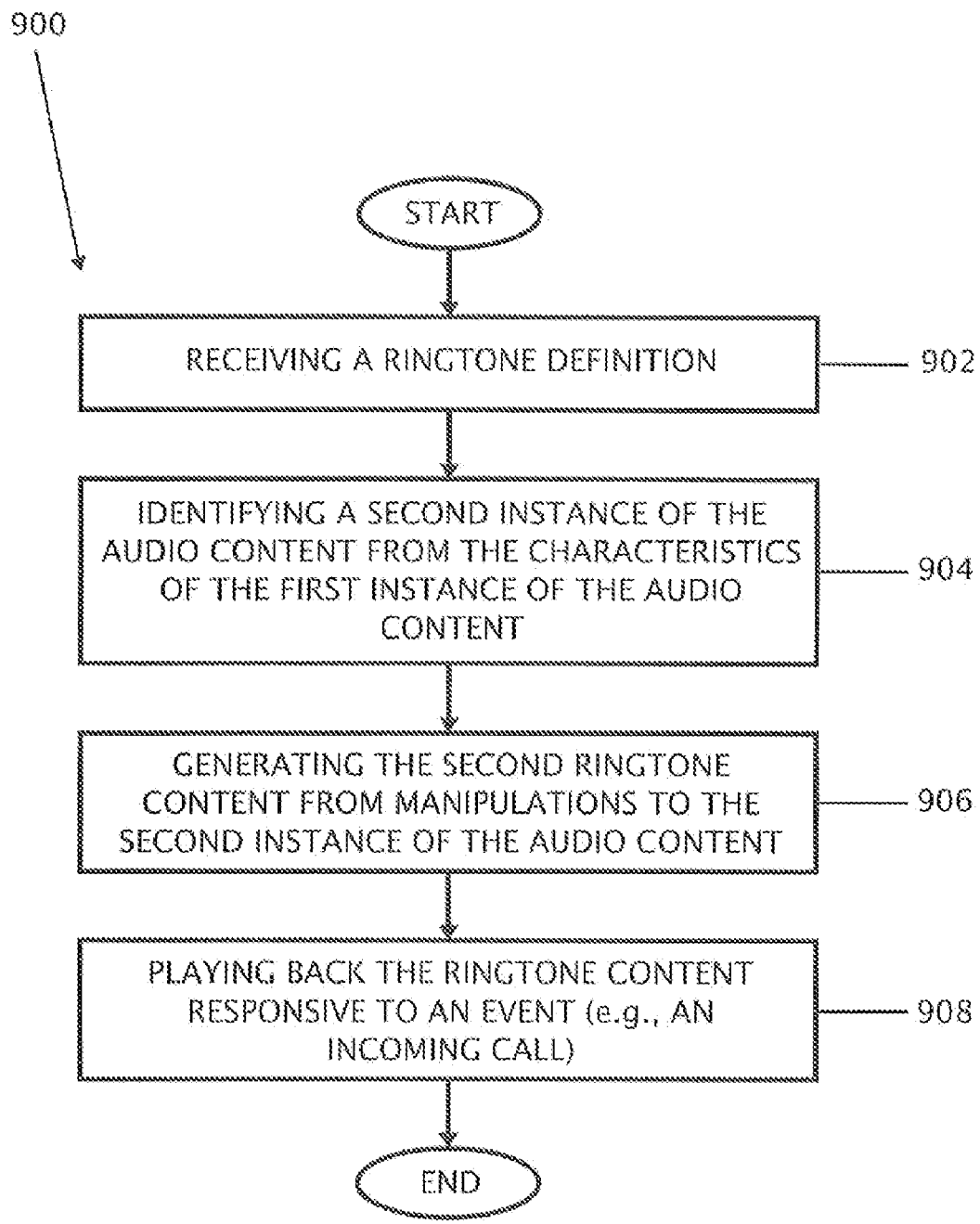
FIG. 9 is a flow chart illustrating a method for receiving the ringtone definition according to one embodiment of the present invention.

FIG. 9 is a flow chart 900 illustrating a method for receiving a ringtone definition according to one embodiment of the present invention. The example of FIG. 9 starts in module 902 where a ringtone receiver receives a ringtone definition. The example of FIG. 9 continues to module 904 where the ringtone receiver searches an associated content database for audio content matching those audio content characteristics associated with the ringtone definition. In one embodiment, the receiver conducts the search using tolerance metrics to account for audio content that is substantially similar despite variances in format, bit rate, song length, and the like. The example of FIG. 9 continues to module 906 where ringtone content is generated by applying the edits associated with the ringtone definition to the audio content identified in module 904. In one embodiment where a second instance of the audio content cannot be located in module 904, a license can be automatically acquired. In another embodiment where a second instance of the audio content cannot be located in module 904, the ringtone receiver may receive a notice that a license must be acquired in order to obtain the ringtone content. The example of FIG. 9 continues to module 908 where a mobile telephone associated with the ringtone receiver plays back the recreated ringtone content in response to a mobile phone function such as an incoming call.

The order in which the steps of the methods of the present invention are performed is purely illustrative in nature. The steps can be performed in any order or in parallel, unless otherwise indicated by the present disclosure. The methods of the present invention may be performed in hardware, firmware, software, or any combination thereof operating on a single computer or multiple computers of any type. Software embodying the present invention may comprise computer instructions in any form (e.g., source code, object code, interpreted code, etc.) stored in any computer-readable storage medium (e.g., a ROM, a RAM, a magnetic media, a compact disc, a DVD, etc.). Such software may also be in the form of an electrical data signal embodied in a carrier wave propagating on a conductive medium or in the form of light pulses that propagate through an optical fiber.

While particular embodiments of the present invention have been shown and described, it will be apparent to those skilled in the art that changes and modifications may be made without departing from this invention in its broader aspect and, therefore, the appended claims are to encompass within their scope all such changes and modifications, as fall within the true spirit of this invention. For example, the systems and methods of the present invention can be used to share definitions of any type of multimedia file, such as video. Additionally, content can be generated for a variety of uses such as ringbacks (i.e., content played to a caller on an outgoing call while waiting for a called party to answer), and other edited content.

In the above description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus can be specially constructed for the required purposes, or it can comprise a general-purpose computer selectively activated or reconfigured by a computer program stored in the computer. Such a computer program can be stored in a computer readable storage medium, such as, but is not limited to, any type of disk including floppy disks, optical disks, CD-ROMs, and magnetic-optical disks, read-only memories (ROMs), random access memories (RAMS), EPROMs, EEPROMs, magnetic or optical cards, or any type of media suitable for storing electronic instructions, and each coupled to a computer system bus.

The algorithms and modules presented herein are not inherently related to any particular computer or other apparatus. Various general-purpose systems can be used with programs in accordance with the teachings herein, or it may prove convenient to construct more specialized apparatuses to perform the method steps. The required structure for a variety of these systems will appear from the description herein. In addition, the present invention is not described with reference to any particular programming language. It will be appreciated that a variety of programming languages can be used to implement the teachings of the invention as described herein. Furthermore, as will be apparent to one of ordinary skill in the relevant art, the modules, features, attributes, methodologies, and other aspects of the invention can be implemented as software, hardware, firmware or any combination of the three. Of course, wherever a component of the present invention is implemented as software, the component can be implemented as a standalone program, as part of a larger program, as a plurality of separate programs, as a statically or dynamically linked library, as a kernel loadable module, as a device driver, and/or in every and any other way known now or in the future to those of skill in the art of computer programming. Additionally, the present invention is in no way limited to implementation in any specific operating system or environment.

It will be understood by those skilled in the relevant art that the above-described implementations are merely exemplary, and many changes can be made without departing from the true spirit and scope of the present invention. Therefore, it is intended by the appended claims to cover all such changes and modifications that come within the true spirit and scope of this invention.

What is claimed is:

1. A method for sharing ringtone content independent of audio content used to generate the ringtone content, comprising:

receiving a ringtone definition wherein the ringtone definition describes characteristics of and manipulations used to transform a first instance of audio content on a first device into a ringtone content, wherein the manipulations define one or more effects to be applied to an audio recording of the first instance of audio content;

sending the ringtone definition to a second device; and generating the ringtone content from a second instance of the audio content on the second device using the ringtone definition, wherein the second instance of the audio content is separate from the first instance of audio content and the second instance of the audio content is received separately from the ringtone definition;

determining that a licensed version of a second instance of the audio content is not locally available; and automatically obtaining the second instance for the audio content with a license.

2. The method of claim 1, wherein the characteristics of the first instance of the audio content and the characteristics of the second instance of the audio content are substantially similar.

3. A method for sharing ringtone content independent of audio content used to generate the ringtone content, comprising:

receiving a ringtone definition wherein the ringtone definition describes characteristics of and manipulations used to transform a first instance of audio content on a first device into a ringtone content, wherein the manipulations define one or more effects to be applied to an audio recording of the first instance of audio content;

sending the ringtone definition to a second device; and generating the ringtone content from a second instance of the audio content on the second device using the ringtone definition, wherein the second instance of the audio content is separate from the first instance of audio content and the second instance of the audio content is received separately from the ringtone definition, wherein the one or more devices comprises a mobile telephone.

4. A method for sharing ringtone content independent of audio content used to generate the ringtone content, comprising:

receiving a ringtone definition wherein the ringtone definition describes characteristics of and manipulations used to transform a first instance of audio content on a first device into a ringtone content, wherein the manipulations define one or more effects to be applied to an audio recording of the first instance of audio content;

sending the ringtone definition to a second device; and generating the ringtone content from a second instance of the audio content on the second device using the ringtone definition, wherein the second instance of the audio content is separate from the first instance of audio content and the second instance of the audio content is received separately from the ringtone definition, wherein the ringtone definition is received by a ringtone sharing device operated by a ringtone service provider.

5. The method of claim 4, wherein the ringtone service provider sends the ringtone definition to a subscriber of the ringtone service provider.

6. A system for sharing ringtone definitions independent of audio content used to generate the ringtone definitions, comprising:

a ringtone originator that generates ringtone definitions wherein the ringtone definitions describe characteristics of, and manipulations to instances of audio content, wherein the manipulations define one or more effects to be applied to an audio recording of the first instance of audio content;

a ringtone sharing device coupled to the ringtone originator wherein the ringtone sharing device receives the ringtone definitions from the ringtone originator and shares the ringtone definition with a ringtone receiver running on a separate device; and said ringtone receiver that receives the ringtone definitions from the ringtone sharing device.

7. The system of claim 6, wherein the ringtone sharing device is associated with a ringtone service provider.

8. The system of claim 7, wherein the ringtone receiver is associated with a user who subscribes to the ringtone service provider.

9. The system of claim 6, wherein the ringtone sharing device further comprises a monetization module for monetizing the ringtone sharing services that the device provides.

10. The system of claim 6, further comprising a network coupled to the ringtone originator, the ringtone sharing device, and the ringtone receiver.

11. The system of claim 6 wherein the ringtone originator is a user device, and the audio content resides on the user device.

12. A user device comprising:

a ringtone definition stored on a computer-readable storage medium describing characteristics of and manipulations used to transform an audio file into a ringtone, wherein the manipulations define one or more effects to be applied to an audio recording of the first instance of audio content;

said audio file; and a ringtone generator software executing on the user device operable to use the ringtone definition and the audio file to create the ringtone suitable for use on a mobile telephone, wherein the audio file is received separately from the ringtone definition, wherein the user device is the mobile telephone.

13. A user device comprising:

a ringtone definition stored on a computer-readable storage medium describing characteristics of and manipulations used to transform an audio file into a ringtone, wherein the manipulations define one or more effects to be applied to an audio recording of the first instance of audio content;

said audio file; and a ringtone generator software executing on the user device operable to use the ringtone definition and the audio file to create the ringtone suitable for use on a mobile telephone, wherein the audio file is received separately from the ringtone definition, wherein the user device is a personal computer capable of sharing the ringtone definition with the mobile telephone.

14. The system of claim 6, wherein the ringtone originator is a user workstation, the ringtone sharing device is a server in communications with a wireless network, and the ringtone receiver is a mobile telephone in communications with the server over the wireless network.

* * * * *